US005543883A

United States Patent [19]

Green

[11] Patent Number: 5,543,883

[45] Date of Patent: Aug. 6, 1996

[54] CALIBRATION OF SENSITOMETERS

[75] Inventor: Andrew Green, Harrow, England

[73] Assignee: Eastman Kodak Company, Rochester, N.Y.

[21] Appl. No.: 289,049

[22] Filed: Aug. 11, 1994

[30] Foreign Application Priority Data

Sep. 1, 1993 [GB] United Kingdom .................. 9318077

[51] Int. Cl.$^6$ ........................... G03B 41/00; G03C 5/00; G03C 5/04; G01N 21/00

[52] U.S. Cl. ........................... 354/298; 430/30; 430/494; 250/252.1; 356/443; 356/444; 359/20

[58] Field of Search ............ 354/20, 298; 250/252.1 A; 356/443, 444; 430/30, 494

[56] References Cited

U.S. PATENT DOCUMENTS

| | | | |
|---|---|---|---|
| 3,995,959 | 12/1976 | Shaber | 356/202 |
| 4,419,426 | 12/1983 | Kehl | 430/30 |
| 4,985,320 | 1/1991 | Griffin | 354/20 |
| 5,325,171 | 6/1994 | Shimizu | 250/252.1 |
| 5,481,480 | 1/1996 | Green et al. | 430/30 |

FOREIGN PATENT DOCUMENTS

| | | | |
|---|---|---|---|
| 636630 | 12/1963 | Belgium | 430/30 |
| 0290013 | 11/1988 | European Pat. Off. | 356/443 |
| 2316629 | 1/1977 | France | 430/30 |
| 3141758 | 5/1982 | Germany | 250/252.1 A |
| 4-60631 | 2/1992 | Japan | 354/20 |
| 221485 | 10/1968 | U.S.S.R. | 354/20 |
| 1176180 | 8/1985 | U.S.S.R. | 356/444 |
| 1198386 | 12/1985 | U.S.S.R. | 250/252.1 A |

OTHER PUBLICATIONS

J. B. Ross, "An Automated Densitometer System for Measurement of Spectral Sensitivity", J. Appl. Photog. Engineering, vol. 3, No. 4, Fall 1977, pp. 194–198.

Hurter and Driffield, *The Journal of the Society of Chemical Industry,* No. 5, vol. 9, May 31, 1890.

*Primary Examiner*—Charles L. Bowers, Jr.
*Assistant Examiner*—J. Pasterczyk
*Attorney, Agent, or Firm*—Arthur H. Rosenstein

[57] ABSTRACT

Sensitometers are used for monitoring photographic and radiographic processes, and then making it possible to control these processes. However, although it is relatively straightforward to obtain control strips for individual sensitometers, it is often difficult to compare the results of control strips which have been exposed using different sensitometers. Described herein is a method for calibrating or cross-referencing sensitometers. The method comprises exposing a first control strip to a step wedge in the first sensitometer, and a second control strip-to a step wedge in the second sensitometer, the first and second control strips being formed on the same photographic material. The material is then processed and the characteristics of the material is determined using the known exposures given to the material by the second sensitometer and the density values obtained corresponding to those exposures. Once these characteristics are known, it is then possible to calculate the exposure given at each-step on the first control strip using the following equation:

$$E=E_i/(\alpha\{[D_s/(D-D_{base})]^{-\alpha}\}-\alpha)^{-\beta}$$

where

E is the exposure,

D is the density at exposure E, $E_i$ is the exposure at the point of inflexion of the curve, $D_s$ is the density at saturation, and $\alpha$ and $\beta$ are characteristics relating to the photographic material.

2 Claims, 2 Drawing Sheets

CALIBRATION OF SENSITOMETERS

FIELD OF THE INVENTION

The present invention relates to the calibration of sensitometers and is more particularly, although not exclusively, concerned with the calibration of sensitometers for use with radiographic films and processes.

BACKGROUND OF THE INVENTION

Sensitometers are used for monitoring photographic and radiographic processes, and then making it possible to control these processes. However, in order to do this, it is necessary to identify parameters which reliably reflect the state of the process, and which can be conveniently measured on a regular basis.

In the case of a photographic process, it is common to illustrate the photographic response of a particular film, following development in that process, by a curve, sometimes called the "characteristic curve" for the material being measured. This characteristic curve represents the relationship between developed density-and the logarithm of exposure, and is often referred to as the H & D curve, after Hurter and Driffield, *The Journal of the Society of Chemical Industry*, No. 5, Vol. IX, 31st May 1890.

The "characteristic curve" is determined using a control strip as is well known in the art. The control strip is produced by taking a small piece of film and exposing it in a sensitometer by contact with an original step wedge, which has, typically, 21 densities in steps of 0.15 log exposure units (for X-ray films, for example), with light of a colour appropriate to the type of film being used for process control (typically either blue or green for X-ray films). The exposed strip is processed in the processor whose performance is being monitored, and is then ready to be measured.

Densities measured on the control strip are plotted against the relative log exposure, and important process control parameters from the resulting curve can be obtained which characterise the state of the process.

PROBLEM TO BE SOLVED BY THE INVENTION

Although it is relatively straightforward to obtain control strips for individual sensitometers, it is often difficult to compare the results of control strips which have been exposed using different sensitometers—in particular when simple commercial units are used. Commercial sensitometers used for process control can be consistent from one exposure to another, but are not normally intended to be compared with other sensitometers. As a result, it is not often possible to provide any calibration or cross-referencing between sensitometers.

Moreover, as processes and materials vary, it is difficult to obtain accurately repeatable results due to these variations.

SUMMARY OF THE INVENTION

It is therefore an object of the present invention to provide a method of calibrating or cross-referencing one sensitometer with another using the characteristic curve for a particular material as discussed above.

In accordance with one aspect of the present invention, there is provided a method of calibrating a first sensitometer with reference to a second sensitometer, the method comprising the steps of:

a) exposing a first control strip to a step wedge in the first sensitometer;

b) exposing a second control strip to a step wedge in the second sensitometer, the first and second control strips being formed on the same piece of photographic material;

c) processing the-photographic material;

d) determining characteristics of the photographic material using the known exposure values given to the material on the second control strip and measuring the density values corresponding to these exposure values; and e) calculating the exposure for each step on the first control strip using measured density values and the characteristics determined from the second control strip;

characterized in that step e) is carried out using the following equation:

$$E=E_i/(\alpha\{[D_s/(D-D_{base})]^{-\alpha}\}-\alpha)^{-\beta}$$

where

E is the exposure,

D is the density at exposure E, $E_i$ is the exposure at the point of inflexion of the curve, $D_{base}$ is the density of the material support, $D_s$ is the density at saturation, and α and β are characteristics relating to the photographic material.

ADVANTAGEOUS EFFECT OF THE INVENTION

Advantageously, one sensitometer may be taken as a standard to which all other sensitometers are calibrated or cross-referenced. This provides a predictability in the accuracy of results obtained from these sensitometers.

Furthermore, it is possible using the method of the present invention and a single sensitometer to cross-reference different photographic materials using the same process and different processes using the same photographic material.

BRIEF DESCRIPTION OF THE DRAWINGS

For a better understanding of the present invention, reference will now be made, by way of example only, to the accompanying drawings in which:-

DETAILED DESCRIPTION OF THE INVENTION

Copending British patent application no. 9224962.2 filed 28Nov. 1, 1992 describes a method of controlling a photographic processing apparatus when processing a given photographic material by using the characteristic curve for that material. The characteristic curve is determined from a control strip of the photographic material, and is produced by exposing the control strip to a step wedge, and processing the exposed strip in the processing apparatus to be controlled. Density values are measured from the processed control strip in relation to the exposure applied to the strip in the step wedge, and are plotted against the exposure to produce the characteristic curve for the material. The characteristic curve is defined by the equation:

$$D=D_s/[1+(\{E_i/E\}^{\beta})/\alpha]^{\alpha}$$

where

- E is the exposure,
- D is the density at exposure E,
- $E_i$ is the exposure at the point of inflexion of the curve,
- $D_s$ is the density at saturation, and
- $\alpha$ and $\beta$ are characteristics relating to the photographic material.

Figure 1:
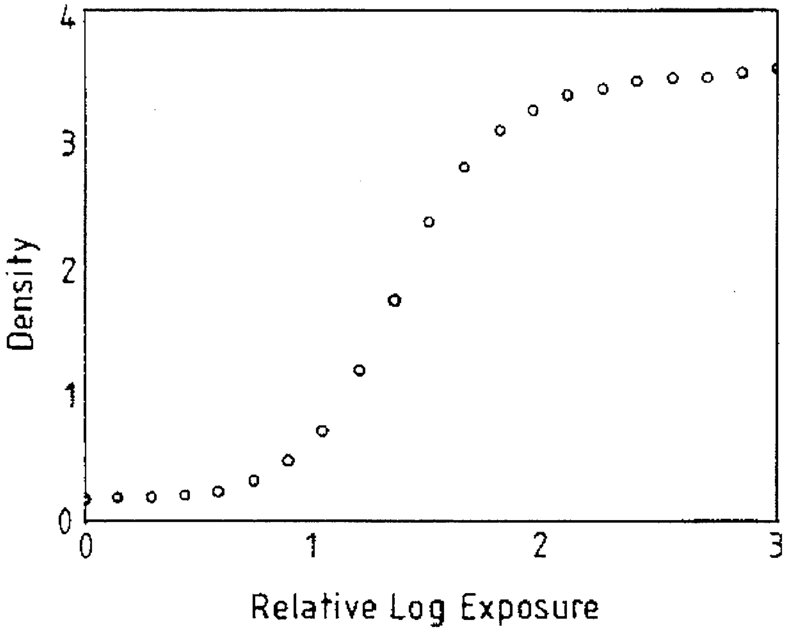
FIG. 1 illustrates a characteristic curve as discussed above.

A characteristic curve is shown in FIG. 1.

In accordance with the present invention, the characteristic curve for a given material is to be used for providing calibration or cross-referencing between two sensitometers. One sensitometer is defined as the reference and may have been calibrated to a known standard. A second sensitometer which is to be calibrated or cross-referenced to the reference sensitometer is defined as the actual sensitometer.

Two control strips are taken, one from each sensitometer, and are exposed on a single-piece of X-ray film material so that they are processed under the same conditions. This procedure is repeated four times.

It will be readily understood that photographic processes may vary from time to time and in order to provide results which are process-independent, it is necessary that the two control strips are processed at the same time. One way of doing this is to expose the two control strips on to the same piece of photographic material as described above, for example, one on each edge of a strip of X-ray film material. However, provided both the strips are processed together, thereby eliminating any variation due to the process, it is possible to use two separate pieces of the same photographic material.

The characteristic curve obtained from the reference sensitometer is fitted to, the equation:

$$D=D_s/[1+(\{E_i/E\}^{\beta}/\alpha]^{\alpha}+D_{base} \qquad (1)$$

where

- E is the exposure,
- D is the density at exposure E,
- $E_i$ is the exposure at the point of inflexion of the curve,
- $D_s$ is the density at saturation,
- $D_{base}$ is the density of the film support, and
- $\alpha$ and $\beta$ are characteristics relating to the photographic material.

This enables the characteristics $\alpha$ and $\beta$ to be determined for the particular material being used in the calibration or the cross-reference. These values of $\alpha$ and $\beta$ can then be used for calculating the exposure values given to the first control strip.

Rearranging equation (1) to give values of exposure, E:

$$E=E_i/(\alpha\{[D_s/(D-D_{base})]^{-\alpha}\}-\alpha)^{-\beta} \qquad (2)$$

Since the process and therefore the underlying characteristic curve for each control strip is the same (as the same material is used for each control-strip), it is then possible to calculate the exposure for each step on the control strip obtained from the actual sensitometer, in terms of the known exposures obtained from the control strip obtained from the reference sensitometer. This is achieved by measuring the densities of the control strip obtained from the actual sensitometer and substituting in equation (2) above together with the constants $\alpha$ and $\beta$ relating to the material used.

Figure 2:
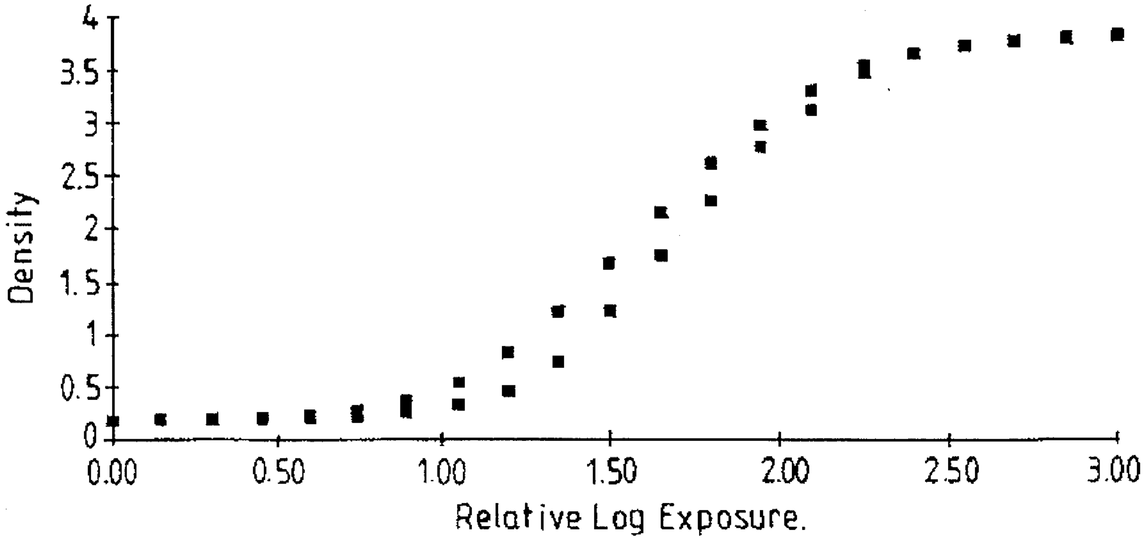
FIG. 2 illustrates a comparison of characteristic curves obtained from two sensitometers.

Following the method described above, two sensitometers were compared. FIG. 2 shows the apparent difference between the two characteristic curves when plotted on the log exposure axis for the reference sensitometer.

Figure 3:
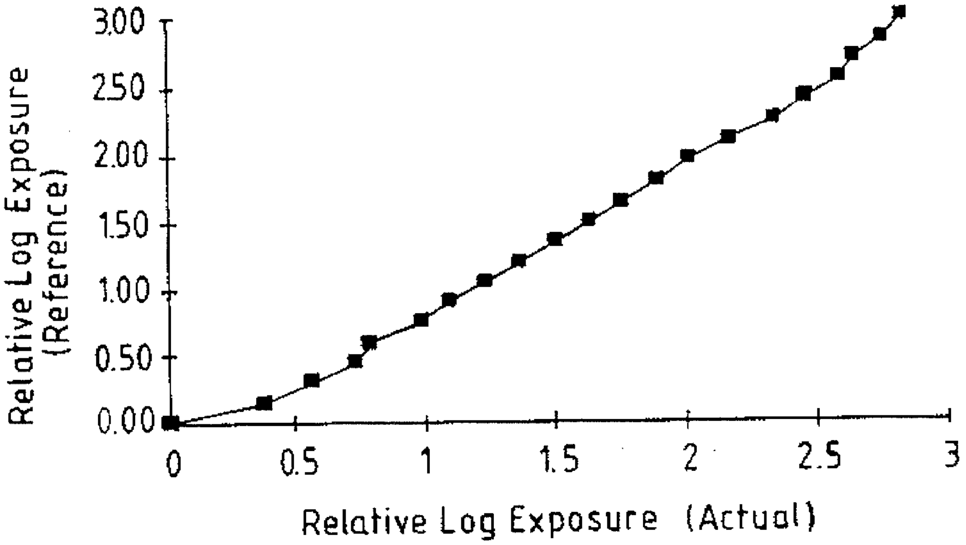
FIG. 3 illustrates a calibration curve which enables one sensitometer to be calibrated in relation to another.

After carrying out the calculations described above, a calibration curve could be constructed as shown in FIG. 3.

Figure 4:
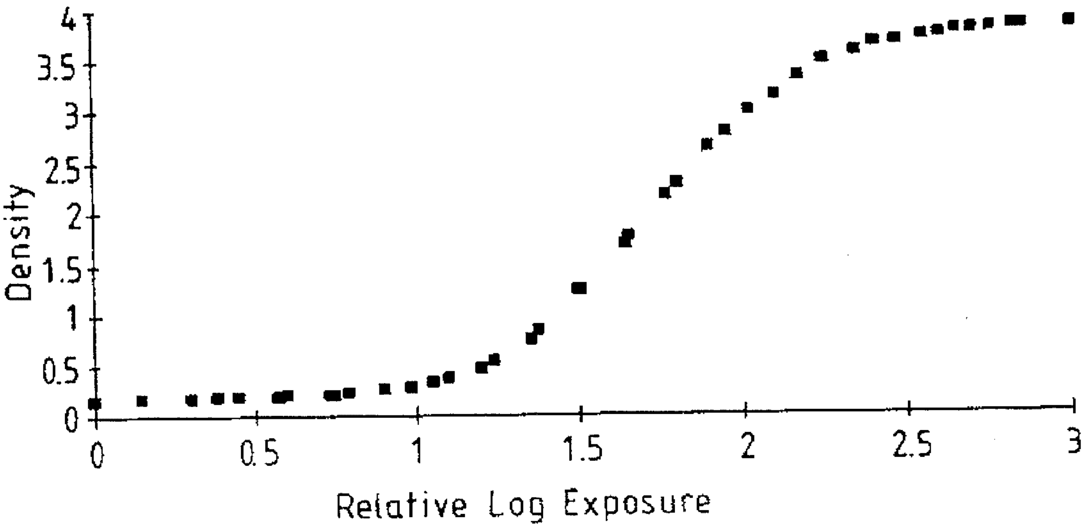
FIG. 4.illustrates the relative log exposures for the corrected values and those of which are used as the reference.

Using this calibration curve, the two original curves were re-plotted with the exposure values for the data obtained from the actual sensitometer corrected. This is shown in FIG. 4.

Advantageously, the method of the present invention can also be used to calibrate or cross-reference different material using the same sensitometer. The method would be the same with the exception of the materials on to which the control strips are formed would be different.

The method of the present invention could also be used to compare different processes by utilising the same material and sensitometer.

It is to be noted that once the exposure values for the actual sensitometer have been obtained it may not be necessary to produce the calibration curve as shown in FIG. 3.

The actual sensitometer could be a simple X-ray sensitometer film/screen system and for each X-ray step, the equivalent light exposure could be determined.

I claim:

1. A method of cross-referencing a first sensitometer with respect to a second sensitometer, the method comprising the steps of:

a) exposing a first control strip to a step wedge comprising a plurality of density values corresponding to exposure units in the first sensitometer;

b) exposing a second control strip to a step wedge comprising a plurality of density values corresponding to exposure units in the second sensitometer, the first and second control strips being formed of the same photographic material;

c) developing the first and second control strips simultaneously in the same processing apparatus d) determining characteristics of the photographic material using the known exposure values given to the material on the second control strip and measuring the density values corresponding to these exposure values, the known exposure values and measured density values being used to provide a characteristic curve for the photographic material; and e) calculating the exposure for each step on the first control strip using measured density values and the characteristics determined from the second control strip;

characterized in that steps d) and e) are carried out using the following equation:

$$E=E_i/(\alpha\{[D_s/(D-D_{base})]^{-\alpha}\}-\alpha)^{-\beta}$$

where

- E is the exposure,
- D is the density at exposure E,
- $E_i$ is the exposure at the point of inflexion of the characteristic curve related to the photographic material on which the first and second control strips have been exposed, $D_{base}$ is the density of the photographic material support, $D_s$ is the density at saturation, and $\alpha$ and $\beta$ are characteristics relating to the photographic material.

2. A method of cross-referencing a first sensitometer with respect to a second sensitometer, the method comprising the steps of:

a) exposing a first control strip to a step wedge comprising a plurality of density values corresponding to exposure units in a first sensitometer;

b) exposing a second control strip to a step wedge comprising a plurality of density values corresponding to exposure units in a second sensitometer, the first and second control strips being formed on the same piece of photographic material;

c) developing the first and second control strips simultaneously in the same processing apparatus;

d) determining characteristics of the photographic material using the known exposure values given to the material on the second control strip and measuring the density values corresponding to these exposure values, the known exposure values and measured density values being used to provide a characteristic curve for the photographic material; and e) calculating the exposure for each step on the first control strip using measured density values and the characteristics determined from the second control strip;

characterized in that steps d) and e) are carried out using the following equation:

$$E=E_i/(\alpha\{[D_s/(D-D_{base})]^{-\alpha}\}-\alpha)^{-\beta}$$

where

E is the exposure,

D is the density at exposure E, $E_i$ is the exposure at the point of inflexion of the characteristic curve related to the photographic material on which the first and second control strips have been exposed, $D_{base}$ is the density of the photographic material support, $D_s$ is the density at saturation, and $\alpha$ and $\beta$ are characteristics relating to the photographic material.

* * * * *